United States Patent [19]

Fukuda

[11] 4,019,346
[45] Apr. 26, 1977

[54] FLEXIBLE COUPLING FOR ROTATING SHAFTS

[75] Inventor: Kazuichi Fukuda, Yokohama, Japan

[73] Assignee: Kanto Special Steel Works Ltd., Japan

[22] Filed: Feb. 11, 1975

[21] Appl. No.: 549,036

[30] Foreign Application Priority Data

Feb. 13, 1974 Japan .............................. 49-17932
Oct. 21, 1974 Japan ............................ 49-120285
Oct. 21, 1974 Japan ............................ 49-120286

[52] U.S. Cl. .................................... 64/12; 64/19; 64/11 R
[51] Int. Cl.² ................................. F16D 3/58
[58] Field of Search ............. 64/12, 19, 11, 27 NM

[56] References Cited
UNITED STATES PATENTS

| | | | |
|---|---|---|---|
| 2,580,781 | 1/1952 | Hoffer | 64/12 |
| 3,004,409 | 10/1961 | Grey | 64/12 |
| 3,246,485 | 4/1966 | Chapman | 64/12 |
| 3,494,147 | 2/1970 | Goody | 64/12 |

Primary Examiner—Samuel Scott
Assistant Examiner—Randall Heald
Attorney, Agent, or Firm—Wenderoth, Lind & Ponack

[57] ABSTRACT

A flexible coupling, for transmitting a great amount of torque from a drive shaft to a driven shaft by directing tensile force to act on connecting members, includes a pair of hub members mounted respectively on the drive shaft and the driven shaft, each hub member having two flanges with a space therebetween in the axial direction of the hub member. Each flange has projections projecting in the radial direction of the flange, each projection peripherally adjoining void spaces. The hub members as a pair are so constructed as to enable the projections of the flanges of one hub member to fit into the void spaces of the flanges of the other hub member, leaving a clearance between any facing portions of the flanges of the facing hub members with no contact therebetween. Retaining members are provided, each such member extending parallel to the axis of the hub member and having both ends thereof supported by the projections of the two facing flanges of each of the facing hub members. A plurality of laminated connecting members consisting of a plurality of sheet-like connecting elements are provided. Each such member is inserted into a space between the flanges so as to have one end thereof retained by the retaining member supported by the flanges of one hub member and the other end thereof retained by the retaining member supported by the flanges of the other hub member. The connecting members connecting the hub members are thus themselves formed into a polygonal link.

14 Claims, 26 Drawing Figures

FLEXIBLE COUPLING FOR ROTATING SHAFTS

BACKGROUND OF THE INVENTION

The present invention relates, in general, to a flexible coupling for rotating shafts, and more particularly to a flexible coupling for rotating shafts and which is capable of transmitting a great amount of torque between rotating shafts, even when they are placed in mutual misalignment.

Mutual misalignment is herein desired as involving: (1) axial misalignment, (2). angular misalignment and (3). displacement between the drive shaft and the driven shaft.

The prior art flexible couplings for rotating shafts include rubber or metal springs used as an elastic body or gears having sliding contact between meshing teeth faces. However, the former type of flexible coupling utilizing an elastic body such as rubber, can transmit torque of only a comparatively small amount for the size of the coupling, and fails to handle torque of a great amount. The latter type of the flexible coupling transmits torque by teeth faces of gears being in sliding contact, thus causing wear or spalling of such faces, thereby resulting in such serious damage as to necessitate replacement of the gears after a comparatively short time. In spite of this disadvantage, this kind of flexible coupling is capable of transmitting a great amount of torque for its very small size, so that it is popularly used in installation such as rolling mills installed in steel plants or similar plants. Though performance is lowered by the wear unavoidably caused as mentioned above, this gear coupling is the only one that is usable for such installation, and hence there is no alternative but to use it.

SUMMARY OF THE INVENTION

It is an object of the present invention to provide a flexible coupling for rotating shafts which is free from the above-mentioned disadvantages of the gear coupling of conventional type and which is capable of transmitting a greater amount of torque than transmitted by conventional type coupling of nearly the same size, without using sliding contact between teeth faces of gears, such coupling of the present invention being produced very easily without using special equipment such as gear hobbing machine.

Another object of the present invention is to provide a flexible coupling for rotating shafts which uses neither an elastic body such as a metal spring nor sliding contact between teeth faces of gears, but which does make tensile force act on a member of great tensile strength connected between drive-shaft side flanges and the driven shaft-side flanges, therefore making it possible to transmit torque of a great amount, and which also utilizes elastic deformation produced in a direction perpendicular to its long direction in transmitting torque between the drive shaft and the driven shaft, when they become placed in mutual misalignement. A further object of the present invention is to provide a flexible coupling for rotating shafts which is so constructed as to absorb impact produced on the drive shaft or on the driven shaft in the axial direction of the coupling and in the direction of any angular misalignment such as is caused by a striking load, thus freeing the connecting members from direct attack by such striking force.

In order to achieve the above objects, the flexible coupling of the present invention is so constructed that there are provided on each of a hub member on the side of the drive shaft and a hub member on the side of the driven shaft two flanges, each having projections extending in the radial direction thereof, each projection adjoining peripheral void spaces. The two hub members are constructed to enable the projections of the flanges of one hub member to fit into the void spaces of the flanges of the other hub member, while leaving a clearance between any facing positions of the flanges of the facing hub members with no contact therebetween. These are fixed, by means of pins or the like between the projections of the respective flanges, connecting members having a high tensile strength and having great flexibility in a direction perpendicular to the axis of the tensile force. The connecting members connect the hub member on the side of the drive shaft and that on the side of the driven shaft, so as to have tensile force act on the connecting members when transmitting torque between the shafts, and at the same time enabling the shafts to operate, as they are placed in mutual misalignment or displacement in the axial direction, by utilizing elastic deformation of the connecting members.

The connection between the hub members on the side of the drive shaft and on the side of the driven shaft, is made by laminated connecting members, each consisting of a plurality of connecting elements in sheet form, each such connecting element having very great tensile strength making it possible to transmit a great amount of torque. The projections of the flanges of one hub member are engaged within the other hub member so that the connection structure is made compact and is positioned substantially at the outside diaMeter of the flanges. Each of members for retaining the connecting members has both ends thereof supported by the respective facing projections of a respective flange. In spite of such simple connecting mechanism, mutual misalignment between the so connected shafts and displacement in their axial direction can be accommodated due to elastic deformation of the connecting members.

If a flexible coupling of the present invention is used instead of a gear coupling of conventional type, one will realize that while both couplings have the same size and while the same amount of torque may be transmitted, the flexible coupling of the present invention will have a longer life, as it operates on the principle of the use of elastic deformation the connecting members without any parts being subjected to friction wear. Moreover, the coupling of the present invention need not be formed by high precision machining such as is necessary in the hobbing of external gears into a crowned shape. Thus, the present invention not only is relatively inexpensive to manufacture, but is also maintenance free over an extended period of use.

DESCRIPTION OF THE PREFERRED EMBODIMENTS

In the following descriptions, the flexible coupling according to the present invention is explained by using drawings showing some preferred embodiments, in comparison with a coupling of conventional type.

Figure 1:
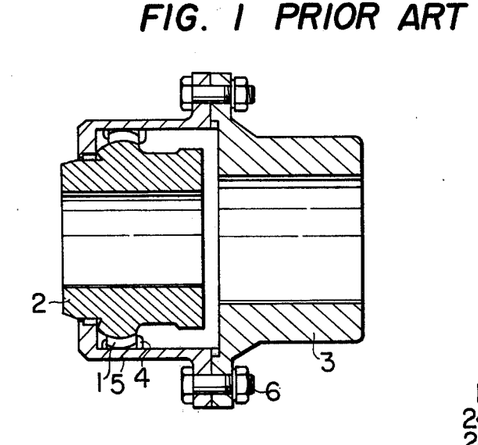
FIG. 1 is a longitudinal sectional view of a gear coupling of conventional type.

FIG. 1 is a longitudinal sectional view of a gear coupling of conventional type, according to which there is devised a gearing connection between a drive-shaft-side hub member 2 having external crown gear teeth 1, and a driven-shaft-side hub member 3, such connection between the hub members being so mechanized that there is provided a sleeve 5 having internal gear teeth 4 each being engaged between respective external gears 1, such sleeve being attached to the driven-shaft-side hub member 3 by through-bolts 6.

Such coupling has the advantage that because of sliding contact of the tooth faces, a relatively greater amount of torque can be transmitted, and the above-mentioned two shafts may operate without trouble, as they are in misalignment through its movement along the circular arc of the external gear teeth 1. But the sliding contact of the teeth faces acts so adversely as to produce wear or spalling of the teeth faces in a short period if they are poorly lubricated, causing the lowering of the efficiency of operation as a disadvantage to offset the above-mentioned advantage.

Figure 2:
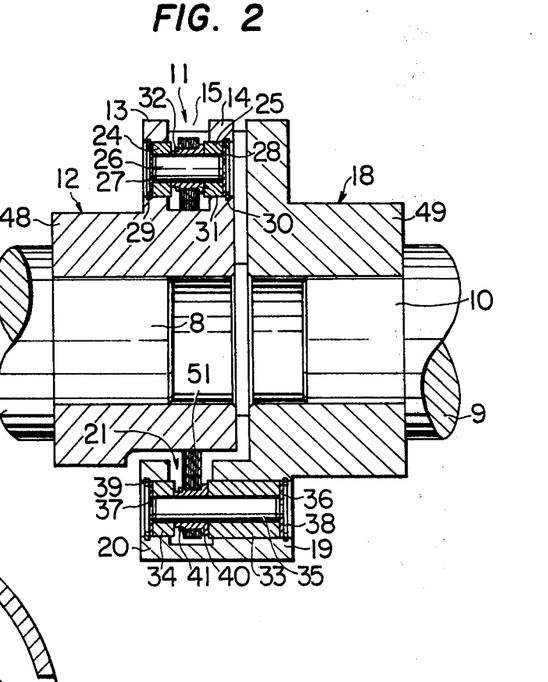
FIG. 2 is a longitudinal sectional view of a flexible coupling according to one embodiment of the present invention.
Figure 3:
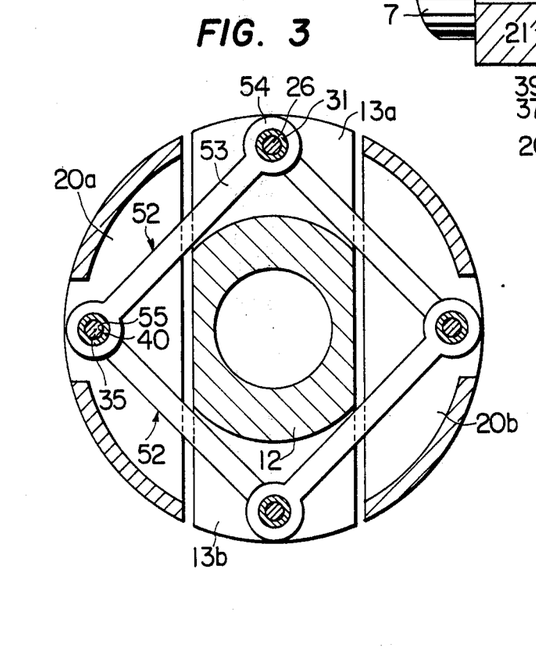
FIG. 3 is a transverse sectional view of the flexible coupling shown in FIG. 2.

As for the coupling of the present invention, it does not use sliding contact between teeth faces, but the connection between the two shafts is attained by using a connecting member functioning as a member to have tensile force act on itself as shown in FIGS. 2 and 3. Referring to these drawings, a flexible coupling 11 has hub members 12 and 18 mounted respectively at the end 8 of a drive shaft 7 and at the end 10 of a driven shaft 9 in such manner that the respective shafts do not rotate separately. The hub member 12 has two flanges 13 and 14 provided so as to face each other in the axial direction with an intermediary space 15 produced between them.

Figure 4:
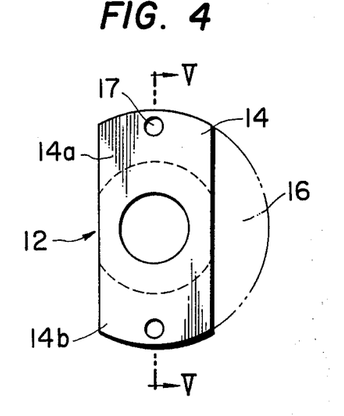
FIGS. 4, 5, 6 and 7 are a front and longitudinal sectional views of respective parts of the flexible coupling shown in FIG. 2.

Such space is to receive the below-mentioned connecting member 51. The flanges 13 and 14 respectively take the shape of a disk partly cut away outwardly from cutting lines running parallel with each other and equally spaced apart from the axis of hub member 12. Thus, there are formed solid parts extending in opposite radial directions on each of the disk-like flanges 13 and 14, such parts hereinafter called projections 13a and 13b for the flange 13 and projections 14a and 14b for the flange 14. The so cut away parts peripherally adjoining the projections 13a and 13b and 14a and 14b will be referred to as void spaces 16, as shown in FIG. 4. There are provided through holes 17 to run respectively through 13a and 14a and through 13b and 14b, both in directions parallel with the drive shaft 7.

Likewise, the hub 18 has two flanges 19 and 20 provided so as to face each other in the axial direction with an intermediary space 21 produced between them. The flanges 19 and 20 respectively take the shape of a disk with a central part having been cut away so as to form a void space 22 shaped like a groove. Thus, there are formed projections 19a and 19b for the flange 19, and projections 20a and 20b for the flange 20, projecting radially and axially in similar directions. The projections 20a and 20b of the flange 20 are completely separate, but are connected respectively with the projections 19a and 19b on the periphery thereof by a connecting portion 21a. The connecting portion 21a has an aperture 21b opening radially outwardly. The flanges 19 and 20 have respectively two through holes 23 to run respectively through 19a and 20a and through 19b and 20b, both in directions parallel with the axis of the driven shaft 9.

The flanges 13, 14, 19 and 20 are so designed in terms of shape and size that when the hub members 12 and 18 are brought to face each other, the projections 13a, 14a and 13b, 14b of the flanges 13 and 14 of the hub 12 extend into the void spaces 22, and the projections 19a, 20a and 19b, 20b of the flanges 19 and 20 of the hub 18 extend into the void spaces 16.

Figure 8:
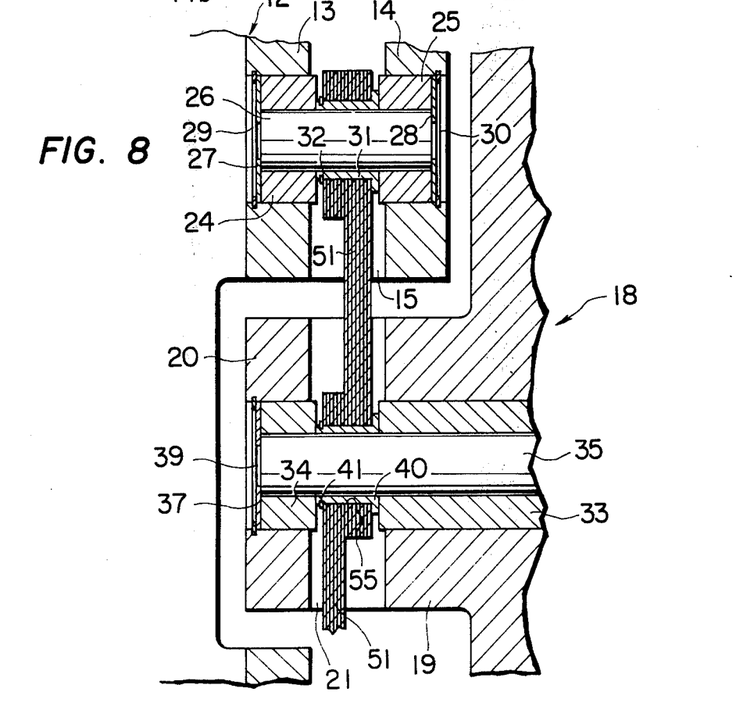
FIG. 8 is a longitudinal sectional view on enlarged scale of the connection of the flexible coupling shown in FIG. 2.

Referring to FIGS. 2 and 3, the hub member 12 on the side of the drive shaft 7 and the hub member 18 on the side of the driven shaft 9, are so connected that on the side of the flanges 13 and 14, there are set to the respective through holes 17, bushes 24 and 25, through which connecting pins 26 are inserted with retainers 27 and 28 provided at the respective ends of each connecting pin 26 for preventing the movement thereof in the axial direction and also with snap rings 29 and 30 provided respectively for fixing retainers 27 and 28. Referring to FIGS. 3 and 8, a connecting member 51 consists of connecting elements 52 made of thin steel sheet or the like; each of such elements having a central portion 53 and end portions 54, each such end portion 54 having an opening 55 to allow such elements in a laminate of many layers to be inserted over and clamped onto a sleeve 31 mounted on the connecting pin 26 until the connecting member 51 is secured by a snap ring 32 provided on one side of sleeve 31.

In a similar manner, bushes 33 and 34 are set in through holes 23 of flanges 19 and 20, through which a connecting pin 35 is inserted with retainers 36 and 37 provided at the respective ends of each connecting pin 35 with snap rings 38 and 39 for preventing the movement of the connecting pin 35 in the axial direction. As in the case of the flanges 13 and 14 on the side of the drive shaft 7, the connecting member 51 is connected to the connecting pin 35 by a sleeve 40 mounted on pin 35 and restrained on sleeve 40 by a snap ring 41.

The connection between the drive shaft 7 and the driven shaft 9 can be attained very easily by using the connecting members 51 set between the flanges 13 and 14 on the side of the drive shaft 7 and also between the flanges 19 and 20 on the side of the driven shaft 9, as follows. Referring to FIG. 8, the connecting member 51 consisting of a plurality of connecting elements is mounted on the sleeves 31 and 40, and is fixed by the snap rings 32 and 41 of the respective sleeves 31 and 40 into a link, such link formed with the connecting members 51 to be inserted into the spaces 15 and then into the space 21 produced respectively between the flanges 13 and 14 and between the flanges 19 and 20. Then the respective bushes 24 and 25 and 33 and 34 are inserted. Final fixing of the connecting member 51 is achieved by the connecting pins 26 and 35 with their retainers and snap rings.

In this connection, the projections 13a and 13b and 14a and 14b respectively of the flanges 13 and 14 on the side of the drive shaft 7 and the projections 19a and 19b and 20a and 20b respectively of the flanges 19 and 20 on the side of the driven shaft 9, can take any polygonal shape or any combination of such shapes, other than the above-mentioned circular arc shape. As for the spaces 15 and 21, there is no need of providing an outward on one side and an inward on the other side nor of providing a groove shape, so that many shapes are usuable, as long as there are provided spaces to fix the connecting members 51 between the drive and the driven hub members.

In the above-mentioned embodiment, the number of projections of each of the flanges 13, 14, 19 and 20 is two, for example, projections 13a and 13b for the flange 13. However, there is no need of so limiting the number of projectons of the flanges, since other numbers will be satisfactory.

Figure 5:
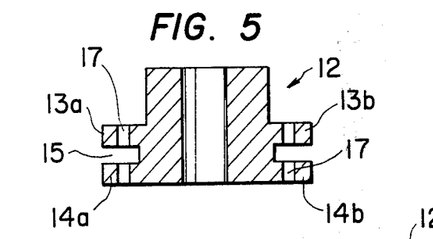
Figure 6:
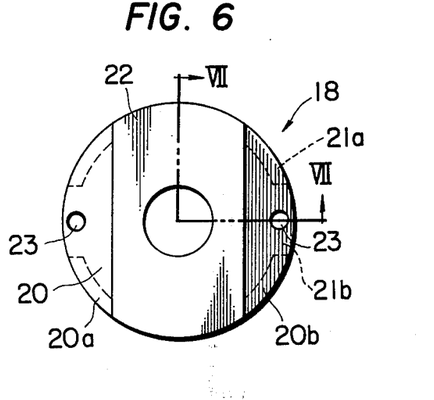
Figure 7:
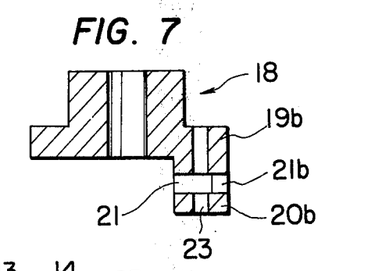
Figure 9:
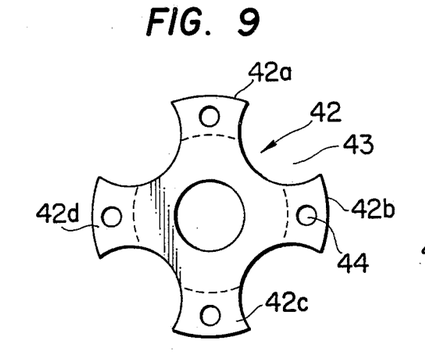
FIGS. 9 and 10 are front views of a variation of the respective parts shown in FIGS. 4 and 6.
Figure 10:
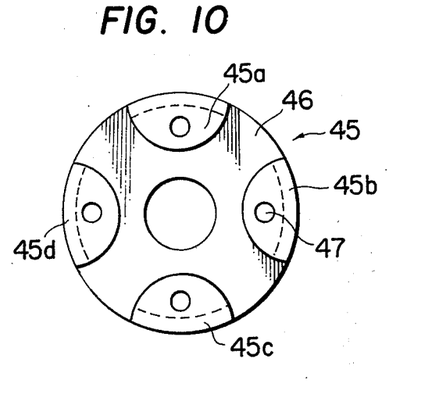
Figure 11:
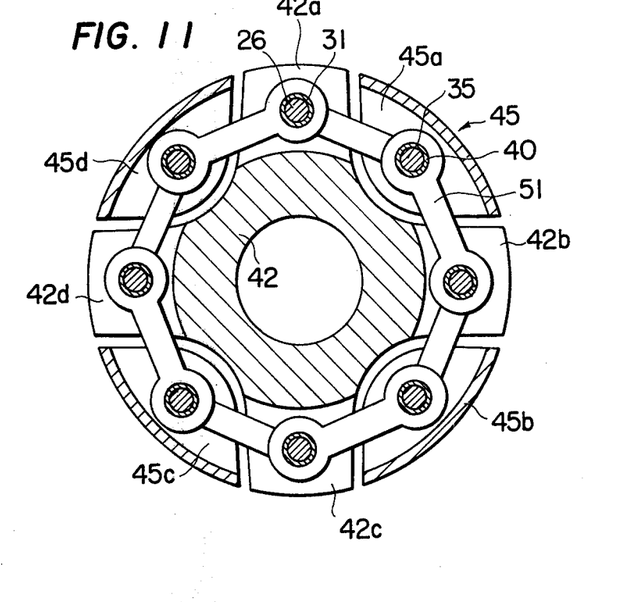
FIG. 11 is a longitudinal sectional view of the flexible coupling of the present invention constructed by using the parts shown in FIGS. 9 and 10.

FIGS. 9 to 11 show a flexible coupling having four projections per flange. The respective cross-sectional views of the flanges of FIGS. 9 and 10 could be presented in the same schematic manner as the respective cross-sectional views of the flanges of FIGS. 4 and 6 shown respectively in FIGS. 5 and 7. In the same manner as in the above-mentioned embodiment, the hub member on the side of the drive shaft in FIG. 9 has a space for receiving a connecting member 51 between flanges 42 which face each other in the axial direction of the hub member. The flange 42 has two pairs of projections (four pieces) 42a, 42b, 42c and 42d, each peripherally adjoining a void space 43, and each projecting in the radial direction and having a through hole 44. Likewise, the flange 45 of the hub member on the side of the driven shaft has projections 45a, 45b, 45c and 45d, each peripherally adjoining void spaces 46 and each having a through hole 47. The projections 42a, 42b, 42c and 42d of the flange 42 are to be engaged with the projections 45a, 45b, 45c and 45d of the flange 45, leaving a clearance designedly produced between any facing positions on the so engaged projections.

FIG. 11 shows the connection between the hub member on the side of the drive shaft and that on the side of the driven shaft each having four projections. This connection is made nearly in the same way as the connection in the above-mentioned embodiment, so that the connecting member 51 connects between the flanges 42 and 45 alternately in the peripheral direction, such members themselves forming a polygonal link. In the embodiment of FIG. 8, the connecting member 51 is applied as a set of a plurality of laminate connecting elements, but it may be possible to apply each such connecting member 51 with its connecting elements running alternately in counter directions from a sleeve 31 or 40.

In the above-mentioned two embodiments, there are respectively used connecting pins 26 and 35 respectively with bushes 24, 25 and 33, 34 and respectively with retainers 27, 28 and 36, 37. These accessories make it easy to perform the connection process, including the insertion of the connecting member 51, and to maintain a good connection, but they can be dispensed with depending on the type and the size of the coupling and the amount of torque to be transmitted. Furthermore, the sleeves 31 and 40 and their respective snap rings 32 and 41 are used so as to make possible the insertion of a connecting member 51 as a set of many connecting elements made of thin steel sheet or the like, into the spaces 15 and 21, but they are not indispensable.

Figure 12:
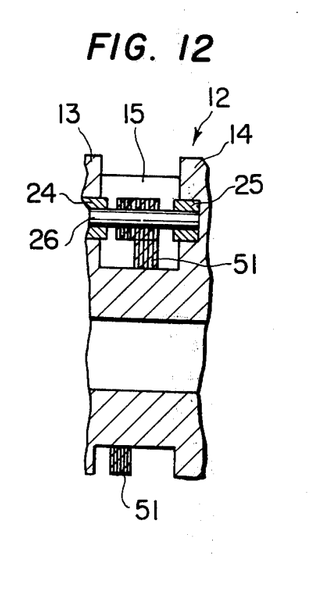
FIG. 12 is a longitudinal sectional view of a flexible coupling of another embodiment of the present invention.
Figure 13:
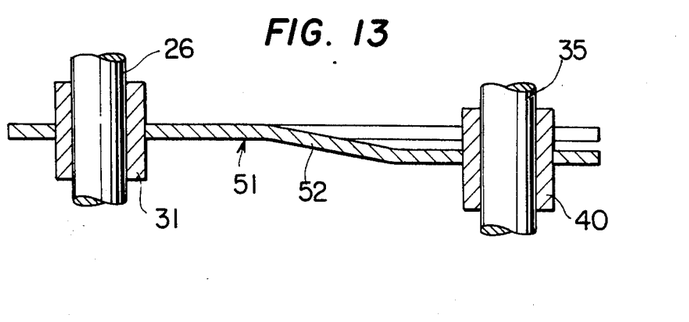
FIG. 13 is a sectional view illustrating the flexibility of the coupling of the present invention.

FIG. 12 shows on embodiment of the invention employing direct attachment of a connecting member 51 to the connecting pin 26 or 35 without using any sleeves like 31 and 40.

One embodiment of the assembly method of the flexible coupling of the present invention constructed as mentioned above, is given in the following:

Referring to FIGS. 2 and 3, the hub member 12 on the side of the drive shaft and the hub member 18 on the side of the driven shaft, are so engaged as to have the projections 13a, 13b and 19a, 19b of the flanges of the respective hub members set at the prescribed positions. The connecting members 51 are inserted peripherally into the spaces 15 and 21 each produced between flanges so as to be in the form of a polygonal link. The sleeves 31 and 40 are positioned. The connecting pins 26 and 35 are inserted respectively into the bushes 24, 25 and 33, 34 and fixed respectively with the snap rings 29, 30 and 38, 39.

In the case of the flexible coupling shown in FIG. 12, the prescribed number of connecting members 51 are inserted into the spaces 15 and 21 each produced between flanges respectively from the peripheral opening of the space 15 and from the peripherally opening aperture 21b, and then the connecting pins 26 and 35 are inserted through the respective through holes.

As mentioned in the above description of the embodiments of the coupling of the present invention, the hub member 12 on the side of the drive shaft and the hub member 18 on the side of the driven shaft are connected only through the medium of the connecting members, and there is no connection in any way and anywhere between the hub members themselves, and therefore, no interference between them during rotation of the coupling. Torque transmitted from the drive shaft 7 to the hub member 12, is further transmitted to the connecting member 51, the hub member 18 on the side of the driven shaft and then to the driven shaft 9.

As for the transmission of torque from the hub member 12 to the hub member 18, it is made mainly by one of pairs of connecting members 51 paired with respect to the center of the hub member. The connecting members 51, bearing torque, have acting thereon tensile force equivalent in amount to the torque. If any force acts on the connecting members 51, they can move over the range of a clearance between the opening and the connecting pin 26 or 35. Therefore, the machining accuracy of the coupling parts, such as the flange holes 44 and 47, and the openings 55 of connecting member 51, is not critical. The connecting member 51 is provided adjacent the circumference, and thus can transmit large torque by its very high tensile strength, if made of thin high tension steel sheet or the like. If the number of such members is increased according to necessity, it will be possible to transmit torque of the same or even a greater amount than the gear coupling of conventional type. As the connecting member 51 is so set as mentioned above and shown in FIG. 8, angular misalignment between the drive shaft 7 and the driven shaft 9 will be accommodated in the rotating motion of the coupling by the elastic deformation produced mainly by bending and a slight amount of twisting of the connecting member 51 caused by a resultant force of bending for a greater part and distortion for a part. Such deflection of the connecting member 51 is not other than a deflection taking place within the elastic limit of the connecting member 51. Moreover, in case the connecting member 51 is made of thin steel sheet or the like having a very high yield point, such extent of elastic deflection as is necessary for the gear coupling of conventional type to take care of angular misalignment, will be guaranteed to be within the elastic limit of such connecting member, thus substantially avoiding fatigue failure from repeated deformation, even after use for long periods of time.

As mentioned above, the coupling of the present invention has none of its parts operating on sliding contact, and thus causes no trouble due to wear, even without lubrication. Therefore, it can satisfactorily perform for a long period of time in a condition as good as when originally placed into use. As above-mentioned elastic deformation of the connecting members can be used to accommodate angular misalignment between the drive and the driven hub members with better and smoother rotation than the gear coupling of conventional type. This is particularly true because the coupling of the present invention uses connecting members 51 which can also absorb vibrations in the axial direction as well as in the rotation direction through elastic deflection, and hence has very small influence on the supporting bearing and the other parts of the transmission system compared with the ease where other kinds of couplings are used.

The connecting pins 26 and 35 for retaining the connecting members 51 have both sides of their respective ends supported respectively by the flanges 13, 14 and the flanges 19, 20 thus constituting a double supported beam structure. Such pins are more than two times stronger than those of a cantilever structure.

The following is an explanation of the operation of the connecting member.

As mentioned above a connecting member is constructed with a plurality of connecting elements, each being a lamination of a plurality of thin metal sheets. Such connecting elements are repeatedly tensile force, bending moments and torsional moments, but their fatigue failure greatly depends on their tensile fatigue strength in view of the fact that most cases of fatigue failure are particularly due to the shape of the elements. Therefore, it is desirable that the shape of the connecting elements be developed to have a greater strength for a smaller size coupling.

Figure 14:
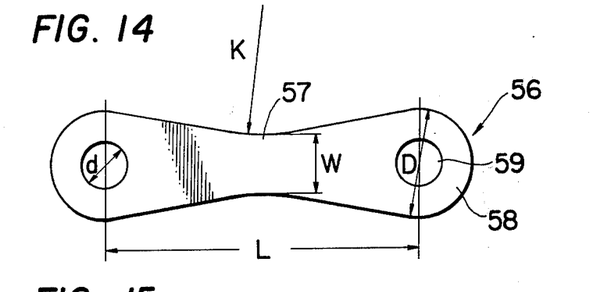
FIGS. 14 and 15 are respectively a plan view and a longitudinal sectional view of one embodiment of a connecting element with which to construct the connecting member used for the flexible coupling of the present invention.
Figure 15:
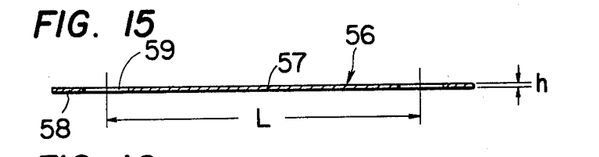

FIGS. 14 and 15 show a connecting element which is developed to meet the above-mentioned demand. Referring to these drawings the connecting element 56 has the central portion thereof narrowed so as to be formed into an ovaloidal shape. Each opposite end portion 58 has the shape of a half-circle of the diameter D, which encloses concentrically an opening 59 of the diameter $d$. End portions 58 are connected by gentle curves which form a narrowed central portion 57. Near the center of the central portion 57, the edge on one side overlaps with a portion of the arc of a circle having the radius K. Assuming the width of the central portion, the distance between openings 59 and the thickness of an element be represented respectively by W, L and $g$, If $d$ is too small for D, the concentration of tensile stress near the opening 59 will become high. If L is too small for the other sizes, bending stresses produced by bending in the direction of the thickness of the element becomes great, thereby making difficult the bending of the element to satisfactorily act as part of the flexible coupling. If W is too small for D and $d$, the element may be broken by buckling, though it may be safe from tensile force.

The above-outlined interrelation in terms of sizes among various parts of the connecting element 56 greatly influences the strength thereof. In view of the inventor of the conducted experiments, the following size relationships are preferred:

| | | |
|---|---|---|
| D/d | = 2 – 3 | 2.5 as optimum ratio |
| W | = D – d | |
| L/D | = 1.7 – 3.0 | 2.35 as optimum ratio |
| R/D | = 1 – 1.5 | 1.25 as optimum ratio |
| h/D | = 0.003 – 0.009 | |

Figure 16:
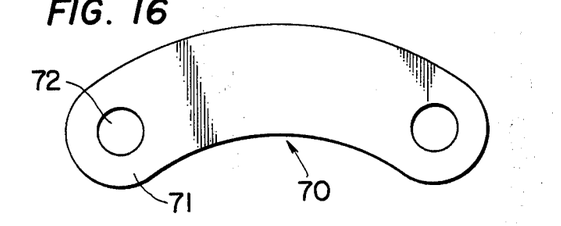
FIG. 16 is a plan view of another embodiment a connecting element of the present invention.

The range between 0.5 and 3 mm is made appropriate by taking the subsequent fabrication process into consideration. FIG. 16 shows another embodiment of a connecting element 70 in the overall form of an arc, and having both ends 71 each peripherally forming a semi-circle the center of which is coaxial with an opening 72. Such connecting elements are provided around the body 48 of the hub member 12 in the form of an arc, thus making it possible to design a coupling of compact size. For use under great load, the connecting element is made of steel in most cases. But for use under small load, they may be made of a plastic material reinforced by means such as inorganic fiber, glass fiber or carbon fiber. In order to enhance the strength of the connecting element, it is put into use after quenching and tempering (low temperature tempering), or without any treatment applied after rolled. Therefore, such an element has a large amount of internal distortion inside and is easily subjected to rust production, and moreover, to stress corrosion because of the great tensile forces acting on it during operation.

Therefore, such connecting elements are handled in a rolling mill or the like, and are corroded seriously by cooling water, the saturated atmosphere, stream, splashes of acids or alkalis and other aggressive substances, thereby significantly lowering the strength and fatigue limit thereof. Thus, the influence of such corrosion cannot be neglected.

Though to a very small degree, there does take place some sliding between the contacting surfaces of connecting elements in layers during bending actions, and which may occasionally cause local heat generation when an angular misalignment becomes abnormally great. If the so generated heat causes the temperature to rise higher than the tempering temperature or the recrystallization temperature (in the case of applying no treatment after rolled), tempering or recrystallization will be caused to take place, again lowering the strength and fatigue limit of the connecting elements.

Elements made of other materials, can be freed from influences of ambient conditions, friction and other factors, with the same degree of difficulty as in the case of steel elements which, as mentioned above, are easily affected by rust production and local heat generation.

In order to eliminate such difficulty, it has been attempted to cover the surfaces of the connecting elements with a film produced zinc-coating or with a metal film made by chromate plating, but such film easily gets worn out or peels off, making an early rust production unavoidable, resulting in a very short life of such elements.

With the purpose of solving the above-mentioned difficulty with connecting elements of the conventional type and of attaining a long life of connecting elements used in such circumstances as mentioned above, the present invention provides a connecting member which is covered and lubricated.

Referring to FIGS. 17 to 20, a sheet-like connecting element 61 is to be one of a plurality of such elements to be formed into a set of connecting elements in plural layers as a connecting member which is to be entirely externally covered by a layer 63, except the through holes 62 extending through the connecting member 60. The material for covering the connecting members each consisting of laminate connecting elements 61 is mainly an elastomer of such synthetic rubber as "Neoprene" or polyurethane. Even when such material is applied to cover the connecting member as a set of connecting elements in many layers, the cover made thereof will not form a rigid structure itself as such material will easily bend and be highly flexible. Also, as such materials are free from attack by oils in most cases, there is no danger of the cover becoming swollen with oils.

Figure 17:
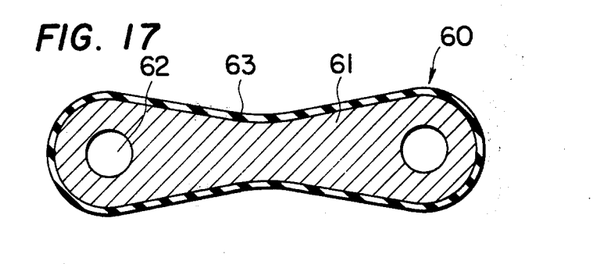
FIG. 17 is a plan sectional view of still another embodiment of the connecting element of the present invention.
Figure 18:
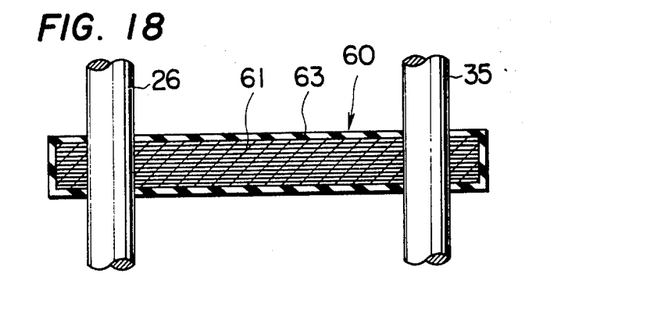
FIG. 18 is a longitudinal sectional view of the connecting member of FIG. 17, as mounted by pins.

A prescribed number of connecting elements 61 of the same shape are laid one piece over another, placed in a mold to be covered with a covering material supplied into the mold, after protecting from covering such parts as the through holes 62 that need no covering, and then entirely heated so as to polymerize and solidify the material. Lubrication is achieved in that a pasty lubricant such as lubricating oil or grease or a powdery lubricant such as molybdenum disulfide or any such as the above-mentioned is applied between the contacting surfaces of any two connecting elements 61. As for a powdery lubricant, it should be applied to the surfaces of connecting elements 61 before covering, and as for a liquid lubricant, it may be injected from the exposed portion of the inside of the through holes 62. Coating and lubrication can be made in any way suitable for the particular materials.

Thus, the lubricant can be completely enclosed in the cover of a connecting member 60 which is interposed between the hub members, thus avoiding the danger of leakage and the need of refilling, and shutting out such exterior influences as rust production or corrosion.

For comparing the effect of a covered connecting member of the covered one used in the wash of cooling water in a hot strip mill.

There were used, as connecting members, sets each of 20 ovaloidal pieces of Bainite-heat-treated carbon steel sheet of 1.2 mm thick laid one piece over another in layers, such members having been covered with polyurethane. As a lubricant, turbin oil was injected between elements. The diameter of the through hole 62 was 50 mm; and the distance between pins was 280 mm. In contrast with the covered connecting member 61 there was used a laminate connecting member consisting of connecting elements which had been subjected to zinc-coating and which had the same shape as of the above-mentioned connecting member.

Having been used for 3 months, the uncovered connecting member collected a great amount of rust, and the breakdown rate of the connecting elements thereof was 33%, while the covered connecting member scarcely accumulated any rust, causing no troubles therefrom.

In the above-mentioned case, both kinds of connecting members were formed of laminate connecting elements of the same ovaloidal shape. However, there is no limit on the variety of the shape of connecting elements.

Figure 19:
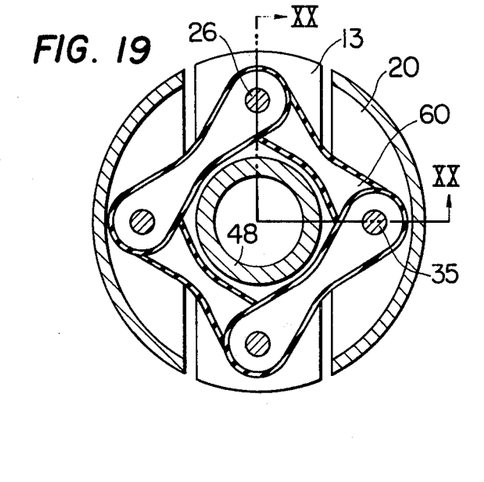
FIGS. 19 and 20 are respectively a transverse sectional view and a longitudinal sectional view of the mounting of the connecting member of FIG. 17 to hubs.
Figure 20:
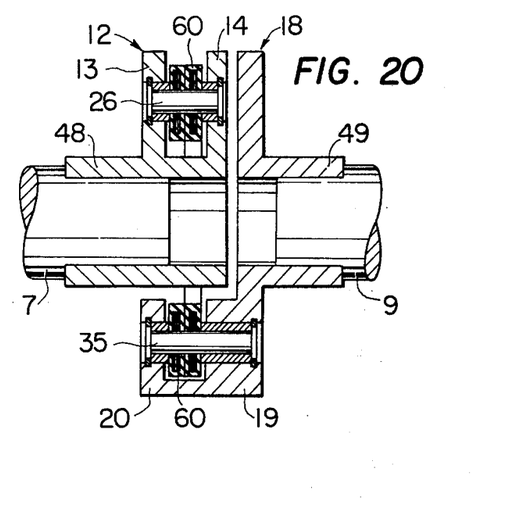

In FIGS. 19 and 20, the connecting member 60 takes an ovaloidal shape, so that the body 48 of the hub member 12 or the outer diameter of body 48 can be made large enough to increase the strength of the body.

Figure 21:
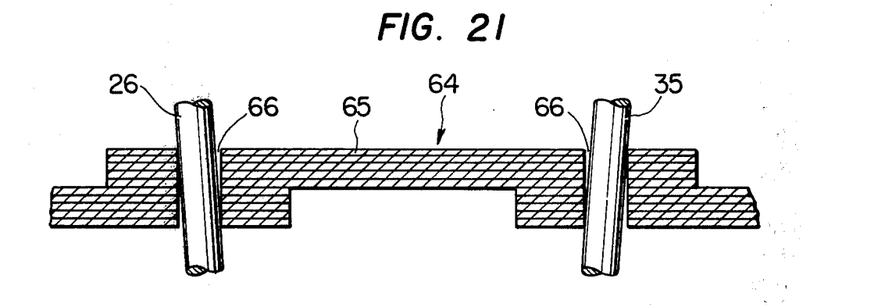
FIG. 21 is a longitudinal sectional view illustrating contact between pins and the inner surface of holes through a connecting member.

As mentioned above, the rotation of the drive shaft is transmitted to the driven shaft through tensile force acting on the connecting elements. The direction of the respective connecting pins corresponds with the axial direction of the drive shaft or of the driven shaft to which they are applied, so that as shown in FIG. 21, there results an angular misalignment between the direction of the connecting pin 26 and that of the connecting pin 35 which corresponds with any angular misalignment between the drive shaft and the driven shaft.

Therefore, in case the shape of the hole 66 bored through the connecting member 64 is cylindrical as with the disk coupling of conventional type, it may be possible that there is angular misalignment between the through hole 66 and the connecting pin in the same order as the above-mentioned angular misalignment between the drive and the driven hub members. FIG. 21 shows that misalignment between the shafts causes uneven contact between the connecting pin and the connecting elements 65, therefore causing each connecting element 65 to produce uneven distribution of tensile force.

The following is a numerical presentation of such complication as mentioned above:

In the case where: The diameter of the through hole of the connecting member is 50.2 mm; the diameter of the connecting pin is 50 mm; the thickness of the connecting element is 1 mm; the thickness of the connecting member is 60 mm; and the angular misalignment is ±1°, if in the above-mentioned condition the gap between the connecting pin and the surface of the through hole is 0 mm in the upper part of the connecting member, at the bottom surface of the layer its displacement is to be 1.05 mm in view of geometric point.

If and when the drive shaft is put into operation, tensile force starts working on the connecting member through the connecting pins, causing elastic elongation to start from the connecting element 65 at the upper position, thereby one after another of all the other connecting elements 65 following it downward to contact the connecting pin 26 or 35 so as to bear the tensile force.

In the above-mentioned case, if the working tensile stress of the connecting element 65 is the same as its fatigue limit of 30 kg/mm$^2$, the elastic elongation of the connecting element 65 is above 0.43 mm, Therefore, the number of pieces of connecting elements 65 which bear such tensile force is;

$$0.43 \div (1.05 \div 60) \approx 24$$

This number is about one third of the total number of connecting elements. The number of connecting elements which are put into such function will naturally increase as the tensile force gets greater, but there may develop the danger of fatigue failure starting from the connecting element at the upper position.

Figure 22:
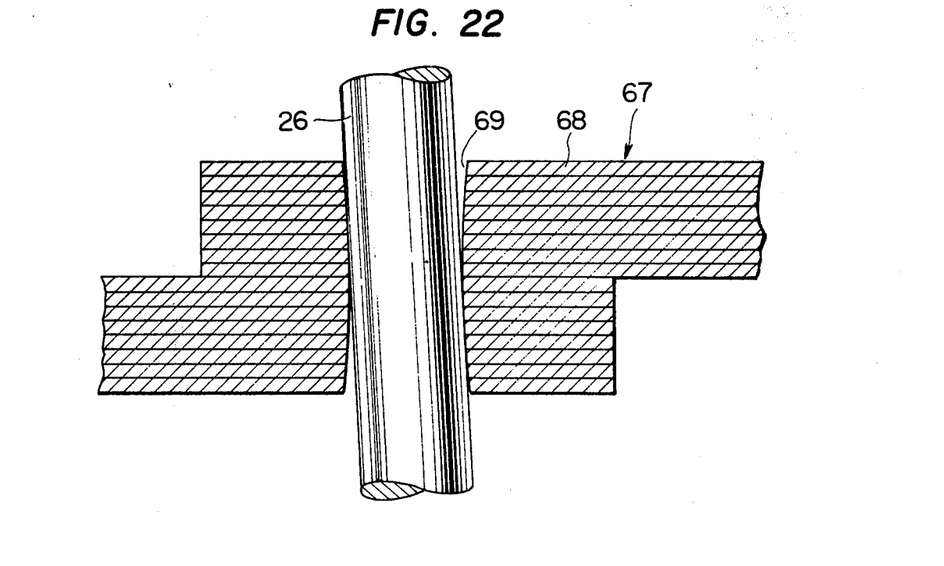
FIG. 22 is a longitudinal sectional view of an improved contact between a pin and a connecting member as a result of the improvement of the borings shown in FIG. 2.

The following embodiment of the present invention avoids the above-mentioned complication with the connecting member consisting of laminate connecting elements, by forming the surface of the through hole bored through the connecting member as shown in FIG. 22, such shape being effective in evenly distriburing forces to even connecting element. The surface is axially symmetrical and tapers outwardly from the axial center of the member.

The above description will make it understood that in the case of using a through hole having a cylindrical shape, the contact between the surface of the through hole and the connecting pin may easily become more uneven as the angular misalignment between the drive shaft and the driven shaft increases, and the connecting element will receive greater tensile force as it is closer to the outermost element of the connecting member. Therefore, two requisites for even distribution of tensile force to the connecting members should be to provide the most even arrangement of the surface contact between the through hole and the connecting pin under the greatest possible angular misalignment, and to modify the cylindrical shape of the through hole to a shape tapering outwardly toward both sides of the member from the center thereof. In other words, the most appropriate shape of the surface of the through hole is such that will provide the greatest contacting length between the connecting pin and the surface of the through hole, when tensile force acts on the connecting pin when in its straight position (deflection of the connecting pin under actual load is negligible), if such can be determined by calculations. But calculations of appropriate curves of the through hole for the greatest possible angular misalignment are complicated, so that such calculations may be replaced by an approximate calculation process for curves to form a hyperboloid of revolution, a circular arc or a polygonal line internally connecting any of the above.

FIG. 22 shows the connecting member 67 having the through holes 69 shaped in an axially symmetrical manner as mentioned above. Such shape can be obtained by laminating a plurality of connecting members 68, each having a through hole of slightly different diameter.

Employing the same numerals, there will now be explained an approximate design of a revolution surface of the axially symmetrical through hole having a circular arc of 850 mm in radius. On the revolution surface of the through hole, the central portion will have a diameter of 50.2 mm. Assuming that the tensile stress acting on the connecting element at the uppermost position is equal to its fatigue limit which is 30 kg/mm$^2$, the number of connecting elements to contact the connecting pin is 54 pieces, meaning that the major part of the connecting elements are being effected. The average amount of tensile stress acting on the connecting element is 20 kg/mm$^2$, which is greater than 15 kg/mm$^2$ in the case of the through hole of cylindrical shape, so that the torque transmitted by the connecting member 67 using the improved connecting elements, is three times as great as conventionally available members. Of course, the designed safe factor being set at about three, such connecting elements are practically used under a load equivalent to approximately one third of the fatigue limit. Under such strict precaution, the connecting element of the improved type can transmit three times as great an amount of tensile force as by that of the cylindrical type. In this embodiment, the greatest possible misalignment angle is assumed to be 1°. This results in that the contacting point between the circular arc of 850 mm in radius and the connecting pin inclining by 1° occurs at a position one fourth of the length of the through hole inwardly from the end of the through hole 69. Not only in this case but also generally, an appropriate revolution surface can be otained for such a circular arc contacting the connecting pin inclining at the greatest possible angular misalignment angle of 1° at a position one fourth of the length of the through hole inwardly. In some cases, nearly the same result can be obtained by replacing such circular arcs partly or wholly with polygonal lines contacting the inside thereof.

The above description presents one embodiment of designing the through hole according to the present invention by a calculation process which proved in practical use to be so good that the life of the connecting element having such through hole was about 10 times as long as that of elements of the cylindrical type, and that the connecting elements of the present invention produce smaller noise than those of the cylindrical type.

Figure 23:
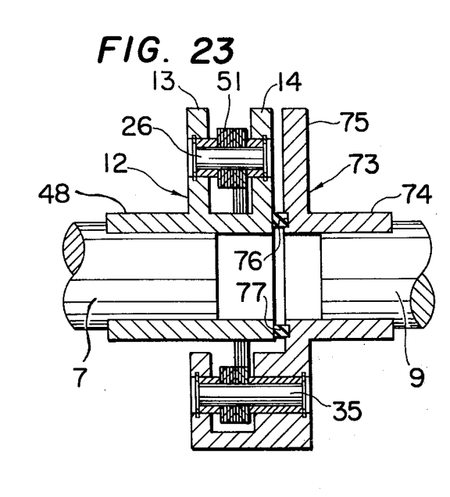
FIG. 23 is a longitudinal sectional view of one embodiment of a flexible coupling designed to absorb the force acting on the coupling in the axial direction.

Even when using flexible coupling constructed as mentioned above, in rotating rolls of a rolling mill, when the rolls are inserted into the wobbler part of the coupling or taken off the coupling the coupling, cannot be free from very great shocking thrust in the axial direction and from a moment strong enough to cause angular misalignment between the shafts. Therefore, a good means for absorbing such impact is desired, as it is not desirable to have connecting parts such as connecting members of the flexible coupling bear such impact directly. According to the present invention, it is possible to absorb such impact, so as to prevent the connecting parts from direct impact force. FIG. 23 illustrates one embodiment of such device wherein the hub members 12 and 73 of the flexible coupling have interposed therebetween a resilient member 77 made of synthetic rubber or the like. The member 77 is attached to one hub member, e.g., the hub member 73 on the side of the driven shaft by means of a ring-like groove 76 provided in the cylindrical body 74. Such member 77 may take the form of a ring in one piece along the groove 76 or consist of a plurality of fragmentary pieces. When the hub members are abutted toward each other, there is left a gap between the end surfaces of the hub members to such extent that possible inclination of either of the shafts 7 and 9 will not cause contact between the flanges 14 and 75 of the respective hub members. The resilient member functions to absorb impact produced by butting of the hub members and to transmit thrust in the axial direction from one shaft to the other. As for thrust, it acts directly on the body 48 of the hub member 12 or the body 74 of the hub member 73, with no influence on the connecting parts of the coupling.

Figure 24:
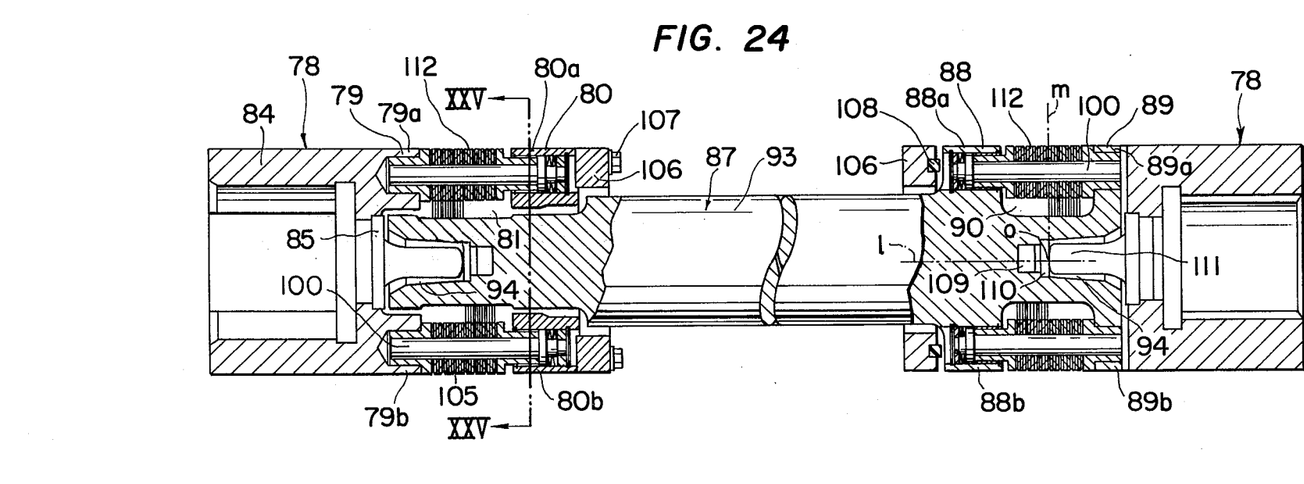
FIG. 24 is a longitudinal sectional view of still another embodiment of a flexible coupling of the present invention.
Figure 25:
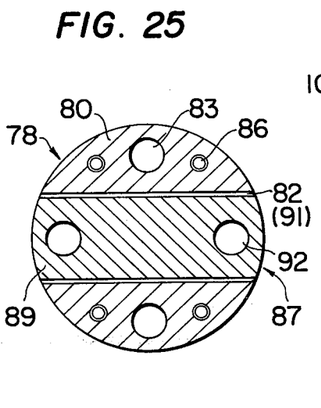
FIG. 25 is a sectional view of the flexible coupling of FIG. 24 on the line XXV—XXV with such accessories as connecting pins and connecting members being omitted for clarity of illustration.

Another embodiment of the flexible coupling of the present invention is shown in FIG. 24.

The flexible coupling of FIG. 24 has the same fundamental construction as that of FIG. 2, but is characterized by the combination of two sets of such couplings. The flexible coupling of this embodiment is suited as a universal coupling for the rolling mill for transmitting a great amount of torque.

Referring to FIG. 24, the coupling consists of a pair of hub members 78 and an intermediate shaft 87. In the drawing, the left side shows the cross-section of the flange of the hub member 78, and the right side shows the cross-section of the flange of the intermediate shaft. Therefore, both sides of the flexible coupling are shown for purposes of better illustration, with two cross-sections respectively offset 90° from each other.

The hub member 78 has two flanges 79 and 80 provided facing each other with spaces 81 therebetween. The flange 79 has the central portion thereof cut away to produce a void space 82, thereby producing projections 79a andd 79b in the axial direction. Similarly the flange 80 has projections 80a and 80b, which are completely separate, and which are connected on their peripheral sides with the projections 79a and 79b of the flange 79. The flanges 79 and 80 have through holes 83 extending axially parallelly through the projections 79a and 79b and through the projections 80a and 80b, As may be understandable from the above-mentioned, the front view of the hub member 78 and the cross-sectional view of its flange section correspond respectively with FIG. 6 and FIG. 7.

Respectively at both ends of the intermediate shaft 87, there are provided two flanges 88 and 89 facing each other with a space 90 therebetween in the axial direction. Each of these flanges is shaped like a disk having a portion or portions cut away with the respective cut lines extending parallel with a diametric line. Therefore the flange 88 has projections 88a and 88b projecting in the radial direction, and the flange 89 has flanges 89a and 89b. Void spaces 91 are provided oppositely of the flanges and projections. The flanges 88 and 89 have through holes 92 extending parallel with the axial line respectively through projections 88a and 88b and through the projections 89a and 89b. As may be understandable from the above-mentioned, the front view of the intermediate shaft 87 and the cross-sectional view of its flange section correspond respectively with FIG. 4 and FIG. 5.

When the so constructed intermediate shaft 87 has both ends thereof abutted with the respective flanges of the respective hub members 78, the projections 79a, 79b, 80a and 80b of the respective flanges of the respective hubs will be positioned within the void spaces 91 of the flanges of the intermediate shaft 87, and the projections 88a, 88b, 89a and 89b of the flanges of the intermediate shaft 87 will be positioned within the void spaces 82 of the flanges of the respective hub member 78.

One of the hub members 78 is connected with the drive shaft, and the other is connected with the driven shaft.

Figure 26:
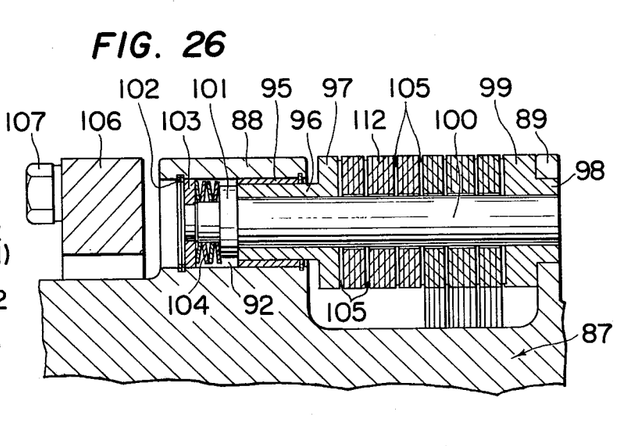
FIG. 26 is a partial enlarged view of the flexible coupling shown in FIG. 24.

FIG. 26 is across-sectional view of the flange section of the intermediate shaft 87, showing in detail the connecting pin 100 supported by the flanges 88 and 89 of the intermediate shaft 87 and also the connecting members 112 positioned on the connecting pin 100.

In the through hole 92 on the side of the flange 88, there is fixedly positioned a bush 95, in which a sleeve 96 with a collar 97 is slidably inserted. In the through hole 92 on the side of the flange 89, there is inserted a sleeve 98 with a collar 99. A connecting pin 100 with a collar 101 is positioned to extend through the sleeves 96 and 98. Also, in the through hole on the side of the flange 88, there is inserted a retainer 103 backed in place by a snap ring 102. Between the retainer 103 and the collar 101 of the connecting pin 100 there are positioned disk springs 104.

To the connecting pin 100 which has both ends thereof supported respectively by the flanges 88 and 89, there are mounted the connecting members 112 of ovaloidal shape, each consisting of a plurality of connecting elements 56. Also, there is interposed a washer 105 made of such a soft resilient material as rubber or plastics between any two adjacent sets of connecting elements, each set consisting of plural elements and between the connecting member 112 and the collar 97 of the sleeve 96 and the collar 97 of the sleeve 98. The outer diameter of the washer 105 is nearly equal to the outer diameter of end portions 58 of the connecting elements 56 and the thickness thereof is one to three times as great as that of the connecting element 56. The method of positioning the connecting member 112 on the member 78 is just the same as mentioned above.

In the above-mentioned structure of the connection between the hub member 78 and the intermediate shaft 87, both ends 58 of the connecting member 112 is subjected to preliminary pressure by the disk springs 104 so as to be pressed against the end surface of the sleeve 96 or 98. Therefore, the force to bend the connecting element 56 in the axial direction, that is the bending force to act on the connecting pin 100 to incline the connecting element 56 in the axial direction, would work on the surface of both ends 58 of the connecting element 56 so that they are kept perpendicular to the axis. Thus the end portions 58 of the connecting element 56 is free from breakage caused by the bending at the opening 59 or by a deformation of the edge of the opening.

The advantage of using washers 105 is that in case the connecting member 112 inclines against the connecting pin 100 in the axial direction, the washers 105 will expand or shrink in the direction of the thickness thereof, allowing the connecting pin 100 to incline with respect to the axial direction so that the inside surface of the opening 59 of the connecting element 56 will be close to the peripheral surface of the connecting pin 100.

As a result, the connecting member 112 receives much a smaller stress than the bending stress acting on the connecting pin when the pin cannot bend, thus making smaller the resultant stress of the tensile stress and bending stress produced on the connecting member 112 against torque, thus preventing fatigue failure. Particularly, the washer 105 interposed between the connecting member 112 and the sleeve 96 and 98, makes the end surface of the connecting member 112 contact the peripheral brim of the collar 97 of the sleeve 96 or of the collar 99 of the sleeve 98, thus preventing the connecting member 112 from breakage by bending.

Furthermore, on the end surface of the flange 80 outside the hub member 78 there is provided ring-shaped stop ring 106 fixed with bolts 107 screwed therethrough in tapped holes 86 provided on the end surface of the flange 80, ring 106 having an outer diameter nearly equal to that of the flange 80 and an inner diameter of such size as to allow the body 93 of the intermediate shaft 87 to extend freely therethrough. The end surface of the stop ring 106 faces the end surface of the flange 88 inside the intermediate shaft 87 with a distance therebetween. On the part of the end surface of the stop ring 106 facing the end surface of the flange 88 there is fixed a cushion piece 108 made of a resilient material such as rubber. When a force acts to separate the hub member 78 and the intermediate shaft 87 in the axial direction, the cushion piece 108 of the stop ring 106 bears such force by abutting the end surface of the flange 88 of the intermediate shaft 87, thus protecting the connecting member 112 from bending force in the axial direction. Even if such force is of a shocking nature, elastic deformation of the cushion piece 108 protects the connecting member 112 from such shocking bending force.

Furthermore, holes 94, each being open toward a respective end surface of shaft 87 and having a diameter tapered outwardly toward the end surface and forming two diametrical stages, and provided at the central portion of each of the ends of the body of the intermediate shaft 87. The hole 94 has in the smaller diameter, inner portion thereof a cushion piece 109 made of a resilient material such as rubber. A push rod 111 is inserted between the hub member 78 and the body 93 of the intermediate shaft 87 in such manner that one end of rod 111 contacts the cushion piece 109 through the intermediary of an intermediate piece 110, and the other end of rod 111 is engaged in a recess 85 in the body 84 of the hub member 78. The end of the push rod 111 contacting the intermediate piece 110 has a spherical surface so as to contact the intermediate piece 110 at a crossing point (O) between the axial line (1) and the central line ($m$) midway through the thickness of the connecting member 112 in the form of a set of laminate connecting elements. Such structure as mentioned above provides the following advantage during the operation of the coupling. While stop ring 106 bears a force acting to separate between the hub member 78 and the intermediate shaft 78, a force working to press the hub member 87 in the axial direction against the intermediate shaft 84 is absorbed between the body 87 of the hub member 78 and the body 93 of the intermediate shaft 87, thereby protecting the connecting member 112 from such force. As the tip of the push rod 111 is in contact with the intermediate piece 110 at crossing point (O), the push rod 111 is substantially in contact with the intermediate piece 110 at the crossing point between the axial lines of the drive shaft and of the driven shaft all the time, even when the two shafts are in misalignment. As the tip of the push rod 111 presents a spherical surface, it can incline in any manner against the intermediate piece 110. Thus the contact between the intermediate piece 110 and the push rod 111 protects the connecting pin 100 and the connecting member 112 from bending forces, thus making smooth the operation of the shafts when in misalignment.

The flexible coupling disclosed in this embodiment can accommodate axial misalignment as well as angular misalignment and axial displacement.

The device to subject the connecting member 112 to preliminary pressure by the disk springs 104, the use of washers 105 and the structure to absorb a force acting to press the hub member to the intermediate shaft 87, as disclosed in this embodiment, may apply also to the flexible coupling shown in FIG. 3.

As mentioned above, the flexible coupling of the present invention is capable of transmitting a great amount of torque relative to its compact size, it can operate smoothly even when the rotating shafts are in misalignment as it has no subject to friction wear, and the coupling in remarkably effective when used for the motor of a rolling mill or as a universal coupling for rolling rolls, in place of the gear coupling of conventional type.

In the above-mentioned embodiments, pins are used for the fixation of the connecting members. However, fixation means, such as sockets by themselves or in addition to pins, are also encompassed within the scope of the invention.

What is claimed is:
1. A flexible coupling for transmitting torque from a drive shaft to a driven shaft, said flexible coupling comprising:
 a first hub member attached to said drive shaft;
 a second hub member attached to said driven shaft;
 each said hub member having a pair of outwardly extending flanges, the flanges of each hub member being axially spaced from each other with a space therebetween;
 the pair of flanges of each said hub member having portions thereof cut away to form void spaces, each defined by and adjoined to projections forming the respective pair of flanges;
 said first and second hub members being constructed such that when axially abutted end-to-end, the projections of one hub member extend and fit into respective complementary formed void spaces of the other hub member, with clearance between all facing complementary surfaces of said first and second hub members so that there is no contact therebetween;
 a plurality of retaining members extending parallel to the axes of said drive and driven shafts at positions substantially equally radially spaced therefrom;
 one each of said retaining members being supported by the projections forming the pair of flanges of one of said hub members, each said retaining mem- ber having one axial end thereof supported by a first flange of the respective hub member and the other axial end thereof supported by a second flange of said respective hub member, said retaining member thereby spanning the axial space between said pair of flanges of said respective hub member;

said retaining members being alternately supported by said first and second hub members, in the circumferential direction of said coupling;

a plurality of laminated connecting members, each formed by a plurality of sheet-like connecting elements;

each said connecting member being mounted at a first end thereof to one of said retaining members supported between the pair of flanges of said first hub member and at a second end thereof to the next circumferentially adjacent one of said retaining members supported between the pair of flanges of said second hub member; and the thus connected connecting members thereby connecting said first and second hub members, and together forming a circumferential polygonal link substantially in a plane perpendicular to said axes of said drive and driven shafts.

2. A flexible coupling as claimed in claim 1, wherein each of said connecting elements is made of a metal sheet having a curved configuration with curved edges from a narrowed central portion smoothly joining with semi-circular opposite end portions, each of said end portions having an opening therethrough, respective said retaining members extending through said openings.

3. A flexible coupling as claimed in claim 1, wherein each of said connecting elements is made of a sheet of plastic material reinforced with an inorganic fiber and having a curved configuration with curved edges from a narrowed central portion smoothly joining with semi-circular opposite end portions, each of said end portions having an opening therethrough, respective said retaining members extending through said openings.

4. A flexible coupling as claimed in claim 1, wherein each said connecting element is made of a metal sheet having the shape of a portion of a circular arc and having openings through opposite end portions, respective said retaining members extending through said openings.

5. A flexible coupling as claimed in claim 1, wherein each said connecting element is made of a sheet of plastic material reinforced with an inorganic fiber and having the shape of a circular arc, with openings through opposite end portions, respective said retaining members extending through said openings.

6. A flexible coupling as claimed in claim 1, wherein each said connecting member has the outer surface thereof covered with a resilient material, and lubricant positioned between the contacting surfaces of adjacent of said connecting elements thereof.

7. A flexible coupling as claimed in claim 1, wherein each said connecting member has two openings therethrough, each said opening having an axially symmetrical configuration tapering outwardly from the center of said member.

8. A flexible coupling as claimed in claim 1, further comprising washers made of elastomer interposed between adjacent of said connecting members themselves and between said connecting members and the respective flange of the respective hub member, said washers comprising means for preventing the connecting members from breakage due to direct contact between the side faces of adjacent connecting members and between the side face of the connecting member and that of the respective flange and the respective hub member.

9. A flexible coupling as claimed in claim 1, wherein each of said projections of said pairs of flanges have axailly aligned bores extending therethrough; and further comprising a plurality of sleeves, one each fitted within axially aligned of said bores.

10. A flexible coupling as claimed in claim 9, wherein said retaining members comprise pins, one each of said pins being supported in a respective one of said sleeves.

11. A flexible coupling as claimed in claim 10, wherein one end of each said sleeve is relatively axially slidably mounted in one of the flanges of the respective pair of flanges, and further comprising spring means positioned for urging said one sleeve end and said one flange apart.

12. A flexible coupling as claimed in claim 1, further comprising a resilient member positioned within one of said hub members; a push rod positioned on the other of said hub members and extending toward said resilient member, said push rod having a curved outer end; and an intermediate member positioned between and in contact with said resilient member and said outer end of said push rod; said resilient member, said intermediate member and said push rod being aligned along the axes of said hub member; said outer end of said push rod contacting said intermediate member at a position radially aligned with the center of the thickness, in the axial direction, of said connecting members mounted on each of said retaining members.

13. A flexible coupling as claimed in claim 1, wherein said first hub member is directly attached to said drive shaft; and said second hub member is directly attached to a first end of an intermediate shaft; a second end of said intermediate shaft having directly attached thereto a third hub member identical to said second hub member, said driven shaft having directly attached thereto a fourth hub member identical to said first hub member, said intermediate shaft being axially aligned with said drive and driven shafts, said third and fourth hub members being coupled together in a manner identical to the coupling between said first and second hub members by means of retaining members and connecting members identical to and arranged in the same manner as said retaining members and connecting members coupling said first and second hub members.

14. A flexible coupling as claimed in claim 13, further comprising a pair of stop rings, one each attached to said first and fourth hub members and in flexible contact with said second and third hub members, respectively, said stop rings comprising means for absorbing axial forces applied in a manner to separate one of said drive and driven shafts from said intermediate shaft.

* * * * *